Patented Oct. 10, 1939

2,175,680

UNITED STATES PATENT OFFICE 2,175,680

FROZEN MATERIAL

Robert Henry Bedford, Prince Rupert, British Columbia, Canada

No Drawing. Application May 11, 1937, Serial No. 141,937

18 Claims. (Cl. 99—195)

This invention relates to frozen materials, such as ice-glazed frozen comestibles.

For many years comestibles, particularly flesh foods such as fish, have been frozen for the purpose of preserving such comestibles until used. Recently, the freezing of comestibles has been effected by the so-called "quick-freezing processes". In any event, when the fish are frozen, they are maintained in cold storage until used.

When frozen fish are maintained in cold storage, they are exposed to air and even at very low temperatures, for example —20° C., the rate of evaporation is comparatively so great that the fish become dry or dehydrated. As a consequence, undesirable changes in the chemical and physical properties of the fish result.

In order to inhibit evaporation directly from frozen fish under storage or other conditions, the frozen fish are dipped in water whereby an envelope or glaze of ice completely surounding the fish is produced. When glazed fish are stored at temperatures below the freezing point of water, evaporation of water takes place from the ice glaze instead of from the fish and thus the evaporation directly from the fish together with the undesirable effects are eliminated.

The ice glaze produced from ordinary water cracks either immediately in many places or it cracks in many places after storage. Where a crack in the glaze appears, there is evaporation of water directly from the cells of that part of the fish and later from the adjacent cells. Due to the fact that the water glaze is brittle, the cracking may be increased or indeed the glaze chipped off, when the glazed fish are moved from one position to another during storage or when they are transported.

In my copending application Serial No. 53,905, now Patent No. 2,093,069, there is disclosed the production of non-cracking ice from eutectic solutions.

I have now found that I can produce a substantially transparent non-cracking glaze, from aqueous solutions containing alcohols, particularly alcohols selected from the class which consists of edible polyhydric alcohols, aldehydic alcohols and ketonic alcohols.

It is, therefore, an object of this invention to provide substantially a transparent non-cracking glaze on frozen comestibles.

Other objects will appear from the following description and appended claims.

In accordance with the principles of the instant invention, when a flesh food such as fish is to be given an ice glaze, the fish are frozen by either a quick freezing process or any other freezing process, and the frozen fish dipped into the glazing solution. The temperature of the glazing solution is usually at a temperature considerably higher than both the temperature of the frozen fish and the temperature of the room in which the glazing operation is performed. As a consequence, when the fish are dipped into the glazing solution and withdrawn therefrom, the glazing solution adhering to the fish, due to the temperature of the fish and the temperature of the glazing room, is substantially immediately frozen providing a glaze completely enveloping the fish. The operation may be repeated, the number of dippings in the glazing solution depending on the thickness of the glaze desired.

The glazing solution contemplated by this invention is an aqueous solution which will produce a transparent non-cracking ice. These results are secured by incorporating various substances, hereinafter more fully described, in the glazing solution. As illustrative examples of the substances which may be incorporated in water to produce the glazing composition contemplated by this invention may be mentioned organic alcohols. As examples of alcohols which have given particularly satisfactory results may be mentioned the polyhydric alcohols, aldehydic alcohols (hydroxy aldehydes) and ketonic alcohols (hydroxy ketones). Ethylene glycol, trimethylene glycol, and glycerol are several specific illustrative examples of polyhydric alcohols which have given satisfactory results. It is to be noted that the polyhydric alcohols only contain hydrocarbon radicals and hydroxyl groups. Carbohydrates, such as arabinose, glucose, mannose, galactose, fructose, sucrose and maltose are several illustrative examples of aldehydric alcohols and ketonic alcohols which have given satisfactory results.

It is apparent from the foregoing that the compounds contemplated by this invention are non-toxic and edible or used in such proportions as to be non-toxic and edible. Further, it is apparent that to secure the transparent glaze to which the invention appertains, the compounds are soluble in water and in the ice obtained from such aqueous solution.

To more clearly illustrate the nature and principles of the invention, there are hereafter set forth several illustrative embodiments of the invention.

acid which has given satisfactory results may be mentioned hydrochloric acid.

Though in the illustrative embodiments Cohoe salmon is specifically referred to, it is to be understood that the invention is not restricted thereto. The principles of this invention may be applied to other varieties and species of fish and indeed to

| | Chemical compound | Concentration | Kind of fish | Temperature fish | Temperature glazing room | Temperature glazing water |
|---|---|---|---|---|---|---|
| | | Per cent weight | | °C. | °C. | °C. |
| 1 | Ethylene glycol | 0.2 | Cohoe salmon | −30 to −35 | −25 | 1 |
| 2 | Trimethylene glycol | 0.2 | do | −30 to −35 | −25 | 1 |
| 3 | Glycerol | 0.3 | do | −30 to −35 | −25 | 1 |
| 4 | Arabinose | 0.3 | do | −30 to −35 | −25 | 1 |
| 5 | Glucose | 0.3 | do | −30 to −35 | −25 | 1 |
| 6 | Mannose | 0.3 | do | −30 to −35 | −25 | 1 |
| 7 | Galactose | 0.3 | do | −30 to −35 | −25 | 1 |
| 8 | Fructose | 0.3 | do | −30 to −35 | −25 | 1 |
| 9 | Sucrose | 0.3 | do | −30 to −35 | −25 | 1 |
| 10 | Maltose | 0.3 | do | −30 to −35 | −25 | 1 |

The concentration in each of the above specific illustrative embodiments is the minimum concentration for the conditions set forth. However, it is to be understood that higher concentrations may be used without departing from the spirit of this invention. Usually, however, the minimum concentrations will be used for any particular set of conditions.

Now with respect to the temperature conditions in the specific examples, it will be noted that the temperature of the frozen fish is between −30° C. and −35° C. and that the temperature of the glazing room is −25° C. These conditions have been selected in order to give the most economic conditions at a temperature known to be sufficiently low for all practical purposes. It is to be understood, however, that the invention is not restricted to these precise temperature conditions. If the temperature of the frozen fish to be glazed is, for example, at a higher temperature, i. e. −10° C., then the minimum concentration of the substances might and could be less than 0.3%. If a lower temperature than −35° C. were used, then a higher concentration of the substances set forth would have to be used. The concentration for any particular set of conditions can be easily determined by simple experiment by any person skilled in the art.

Fish discolor as a result of discoloration of oils or the growth of chromogenic bacteria. Some of the causes which may bring about this are bacterial decomposition of the cell proteins, while the fish are fresh or even if the fish are frozen and stored at too high a temperature, and the leakage of ammonia fumes from the cooling coils or refrigerating system coming in contact with the frozen fish.

The present invention also contemplates markedly reducing or inhibiting the rate of bacterial growth or killing the bacteria and also avoiding the deleterious effect if ammoniacal fumes come in contact with the surface of the glaze. These results are secured, according to the present invention, by making the glazing solution acidic in reaction. Though various degrees of acidity may be employed, I have found that satisfactory results are secured when the solution has an acidity equal to a pH value of 5.5. The solution may be brought to the desired degree of acidity (pH value) by incorporating therein the necessary amount of acidic substance. In the preferred embodiment of this phase of the invention, acids are employed. As an illustrative example of an flesh food including meat of all kinds and nature.

Glazes on comestibles, such as flesh foods, are non-cracking, transparent, water-white in color and smooth. The substances mentioned form concentrated solutions, when the glaze is formed which do not freeze at the storage temperatures used in practice. These solutions rise by capillary action to the surface of the glazes, where they form a film and reduce the vapor pressure characteristics of the concentration of the glazing solution. As a consequence, the commodity treated with a glazing solution of the type herein described is preserved for a longer period of time than heretofore.

The term "edible" as used in the claims is intended to cover substances which are edible and non-toxic or used in such proportions as to be non-toxic and edible.

Since it is obvious that various changes and modifications may be made in the above description without departing from the nature or spirit thereof, this invention is not restricted thereto except as set forth in the appended claims.

I claim:

1. Frozen flesh foods having a transparent ice glaze formed of water containing an edible, water-soluble, polyhydric alcohol in an amount to impart non-cracking characteristics to said glaze, said polyhydric alcohol only containing hydrocarbon radicals and hydroxyl groups.

2. Frozen fish having a transparent ice glaze formed of water containing an edible, water-soluble, polyhydric alcohol in an amount to impart non-cracking characteristics to said glaze, said polyhydric alcohol only containing hydrocarbon radicals and hydroxyl groups.

3. Frozen fish having a transparent ice glaze formed of an aqueous solution having an acidic reaction and containing an alcohol in an amount to impart non-cracking characteristics to said glaze, said alcohol being selected from the class which consists of water-soluble, edible, polyhydric alcohols, aldehydic alcohols and ketonic alcohols.

4. Frozen fish having a transparent ice glaze formed of an aqueous solution having a pH of approximately 5.5 and containing an edible, water-soluble alcohol in an amount to impart non-cracking characteristics to said glaze, said alcohol being selected from the class which consists of water-soluble, edible, polyhydric alcohols, aldehydic alcohols and ketonic alcohols.

5. Frozen fish having a transparent ice glaze formed of an aqueous solution having an acidic reaction and containing an edible, water-soluble, polyhydric alcohol in an amount to impart non-cracking characteristics to said glaze.

6. Frozen fish having a transparent ice glaze formed of an aqueous solution having a pH of approximately 5.5 and containing an edible, water-soluble, polyhydric alcohol in an amount to impart non-cracking characteristics to said glaze.

7. Frozen fish having a transparent ice glaze formed of an aqueous solution having an acidic reaction and containing an edible, water-soluble, aldehydic alcohol in an amount to impart non-cracking characteristics to said glaze.

8. Frozen fish having a transparent ice glaze formed of an aqueous solution having a pH of approximately 5.5 and containing an edible, water-soluble, aldehydic alcohol in an amount to impart non-cracking characteristics to said glaze.

9. Frozen fish having a transparent ice glaze formed of an aqueous solution having an acidic reaction and containing an edible, water-soluble, ketonic alcohol in an amount to impart non-cracking characteristics to said glaze.

10. Frozen fish having a transparent ice glaze formed of an aqueous solution having a pH of approximately 5.5 and containing an edible, water-soluble, ketonic alcohol in an amount to impart non-cracking characteristics to said glaze.

11. Frozen comestibles having a transparent ice glaze formed of an aqueous solution having an acidic reaction and containing an alcohol in an amount to impart non-cracking characteristics to said glaze, said alcohol being selected from the class which consists of water-soluble, edible, polyhydric alcohols, aldehydic alcohols and ketonic alcohols.

12. Frozen comestibles having a transparent ice glaze formed of an aqueous solution having a pH of approximately 5.5 and containing an edible, water-soluble alcohol in an amount to impart non-cracking characteristics to said glaze, said alcohol being selected from the class which consists of water-soluble, edible, polyhydric alcohols, aldehydic alcohols and ketonic alcohols.

13. Frozen comestibles having a transparent ice glaze formed of an aqueous solution having an acidic reaction and containing an edible, water-soluble, polyhydric alcohol in an amount to impart non-cracking characteristics to said glaze.

14. Frozen comestibles having a transparent ice glaze formed of an aqueous solution having a pH of approximately 5.5 and containing an edible, water-soluble, polyhydric alcohol in an amount to impart non-cracking characteristics to said glaze.

15. Frozen comestibles having a transparent ice glaze formed of an aqueous solution having an acidic reaction and containing an edible, water-soluble, aldehydic alcohol in an amount to impart non-cracking characteristics to said glaze.

16. Frozen comestibles having a transparent ice glaze formed of an aqueous solution having a pH of approximately 5.5 and containing an edible, water-soluble, aldehydic alcohol in an amount to impart non-cracking characteristics to said glaze.

17. Frozen comestibles having a transparent ice glaze formed of an aqueous solution having an acidic reaction and containing an edible, water-soluble, ketonic alcohol in an amount to impart non-cracking characteristics to said glaze.

18. Frozen comestibles having a transparent ice glaze formed of an aqueous solution having a pH of approximately 5.5 and containing an edible, water-soluble, ketonic alcohol in an amount to impart non-cracking characteristics to said glaze.

ROBERT HENRY BEDFORD.